United States Patent [19]

Benedict

[11] Patent Number: 5,386,704
[45] Date of Patent: Feb. 7, 1995

[54] APPARATUS FOR AIR CONDITIONING AN ELECTRIC VEHICLE

[75] Inventor: Olusegun Benedict, Les Ulis, France

[73] Assignee: Valeo Thermique Habitacle, Le Mesnil-Saint-Denis, France

[21] Appl. No.: 46,446

[22] Filed: Apr. 13, 1993

[30] Foreign Application Priority Data

Apr. 16, 1992 [FR] France ............................. 92 04712

[51] Int. Cl.⁶ ............................................. F25D 17/00
[52] U.S. Cl. ........................................ 62/325; 62/243; 454/161
[58] Field of Search ............... 62/325, 239, 243, 244, 62/323.3; 454/139, 141, 160, 161; 165/42

[56] References Cited

U.S. PATENT DOCUMENTS

| | | | |
|---|---|---|---|
| 2,222,240 | 11/1940 | Philipp | 62/93 |
| 2,751,758 | 6/1956 | Parrish | 62/325 |
| 2,755,072 | 7/1956 | Kreuttner | 62/325 |
| 3,226,949 | 1/1966 | Gamache | 62/505 |
| 3,355,900 | 12/1967 | De Coye De Castelet | 62/244 |
| 3,805,540 | 4/1974 | Schwartzman | 62/238 |
| 4,307,575 | 12/1981 | Popinski | 62/148 |
| 4,570,450 | 2/1986 | Takemi et al. | 62/199 |
| 4,616,693 | 10/1986 | Dietzsch et al. | 165/41 |
| 4,667,480 | 5/1987 | Bessler | 62/180 |

FOREIGN PATENT DOCUMENTS

| | | | |
|---|---|---|---|
| 2451221 | 5/1976 | Germany | B60H 1/22 |
| 3207383 | 9/1983 | Germany | F01P 9/06 |
| 57-178913 | 11/1982 | Japan | B60H 3/00 |

*Primary Examiner*—Henry A. Bennett
*Assistant Examiner*—William C. Doerrler
*Attorney, Agent, or Firm*—Morgan & Finnegan

[57] ABSTRACT

An electric vehicle has an air conditioning system including an evaporator and a condenser arranged in a refrigerant fluid circuit. The evaporator and condenser are used respectively, in summer for cooling and in winter for heating, the air which is delivered into the cabin of the vehicle. For this purpose, the evaporator and condenser are disposed respectively in a first branch and a second branch of the air circuit, with a valve being provided for bringing each of these branches selectively into communication with a cabin air inlet and an evacuation duct for evacuating air to outside the vehicle.

6 Claims, 3 Drawing Sheets

5,386,704

APPARATUS FOR AIR CONDITIONING AN ELECTRIC VEHICLE

FIELD OF THE INVENTION

This invention relates to the air conditioning of vehicles, and in particular electric vehicles.

BACKGROUND OF THE INVENTION

One known apparatus for regulating the temperature in the cabin of a vehicle makes use of an air conditioning apparatus in which a refrigerant fluid flows in one direction between an evaporator, in which it receives heat from an air stream, and a condenser in which it yields heat to an air stream. In this known type of apparatus, when it is required to cool an air stream before delivering it into the cabin of the vehicle, it is brought into contact with the evaporator. On the other hand, when it is required to heat an air stream before delivering it into the cabin, use is commonly made for this purpose of the heat which is given off by the internal combustion propulsion engine of the vehicle.

In the case of an electric vehicle, the heat which is produced by the electrical propulsion system is not enough to satisfy the heating requirements of the cabin under severe weather conditions in winter. It is therefore necessary to provide an auxiliary source of heat.

DISCUSSION OF THE INVENTION

An object of the invention is to enable use to be made of the existing air conditioning apparatus for heating the vehicle, without any need to change the direction in which the refrigerant fluid flows in its circuit.

According to the invention, apparatus for controlling the temperature in the cabin of a vehicle by means of an air conditioning apparatus, in which a refrigerant fluid flows in one direction between an evaporator, in which it receives heat from an air stream, and a condenser in which it yields heat to an air stream, such that an air stream is cooled by contact with the evaporator or heated by contact with the condenser before being delivered into the cabin, is characterised in that it includes two inlets for external air, associated with a first branch and a second branch of the air circuit respectively, the evaporator being disposed in the first branch and the condenser being disposed in the second branch, the apparatus further including a duct for evacuation of air to the outside of the vehicle, and means for bringing each of the first and second branches into communication with a corresponding element of the apparatus, selected according to demand from a cabin air inlet and the said evacuation duct.

Preferably, components of the vehicle which are to be cooled are disposed in an upstream branch of the air circuit, which is interposed between the said first branch and the corresponding external air inlet.

Preferably, a source of applied heat, having control means, is arranged in the said upstream branch.

Preferably, the said components to be cooled comprise a power supply battery for an electric propulsion motor of the vehicle and/or a compressor which is part of the air conditioning apparatus.

The upstream branch is preferably subdivided into two ducts in parallel, namely a first duct containing the battery and a second duct containing the compressor and/or the said heat source.

The apparatus preferably includes bypass means for bringing the downstream end of the upstream branch into communication selectively with the first branch or the evacuation duct, and/or means for closing the inlet of the upstream branch, with a first recycling duct enabling air to be drawn from the cabin into the first branch when the latter is receiving no air from the upstream branch.

The apparatus preferably includes means for closing the external air inlet of the second branch, and a second recycling duct which enables air to be drawn from the cabin into the second branch when the said inlet of the latter is closed.

Preferably, the apparatus further includes a second evaporator disposed in the second branch and arranged in the refrigerant fluid circuit, in parallel with the first evaporator disposed in the first branch.

Further features and advantages of the invention will appear more clearly on a reading of the detailed description of preferred embodiments of the invention which follows, and which is given by way of example only and with reference to the accompanying drawings.

DESCRIPTION OF PREFERRED EMBODIMENTS OF THE INVENTION

Figure 1:
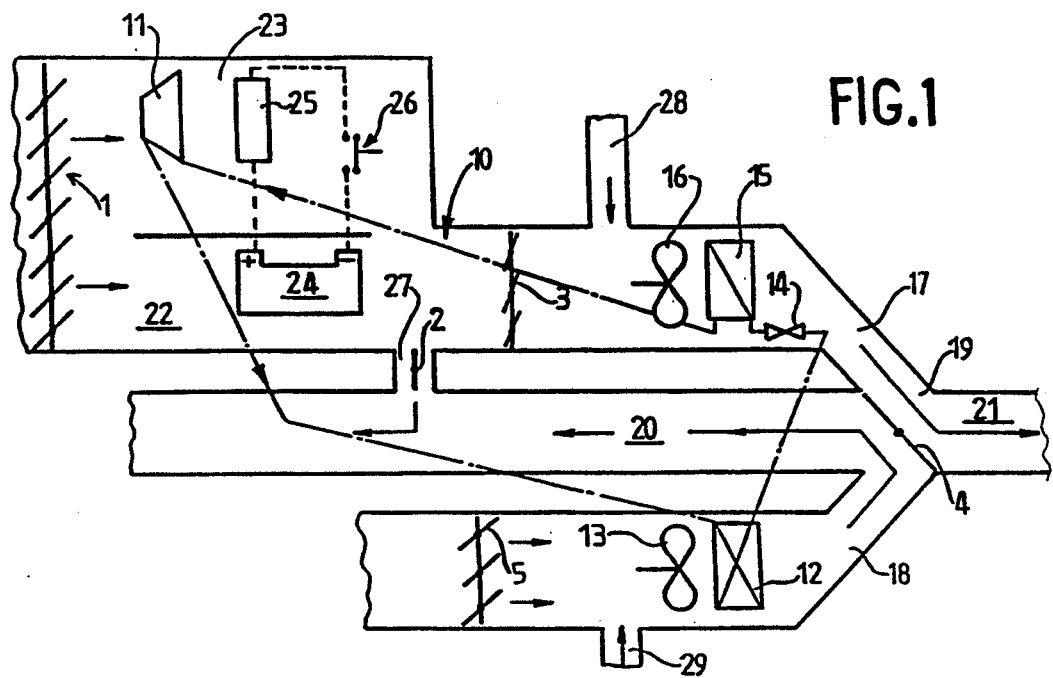
FIGS. 1 to 5 are diagrams showing an apparatus in accordance with the invention and illustrating the configuration of the air circuit under different operating conditions.

The diagrams in FIGS. 1 to 5 show a refrigerant fluid circuit 10 for an air conditioning system of an electric vehicle. The circuit 10 is in the form of a closed loop in which are arranged, in this order, a compressor 11, a condenser 12 associated with a motorised fan unit 13, a throttle 14 and an evaporator 15 which is associated with the second motorised fan unit 16. The throttle 14, evaporator 15 and motorised fan unit 16 are arranged in a first branch 17 of the air circuit, while the condenser 12 and its associated motorised fan unit 13 are arranged in a second branch 18 of the circuit. The upstream ends of the branches 17 and 18 may be closed in a controlled manner by means of respective obturator or shutter valves 3 and 5. These latter are shown in the drawings diagrammatically in the form of sets of pivoting vanes.

The downstream ends of the two branches 17 and 18 are open into a junction zone 19, from which an air outlet duct 20 leads towards the outside of the vehicle. An air inlet 21, which may be in the form of a duct, leads from the junction zone 19 into the cabin of the vehicle.

Figure 2:
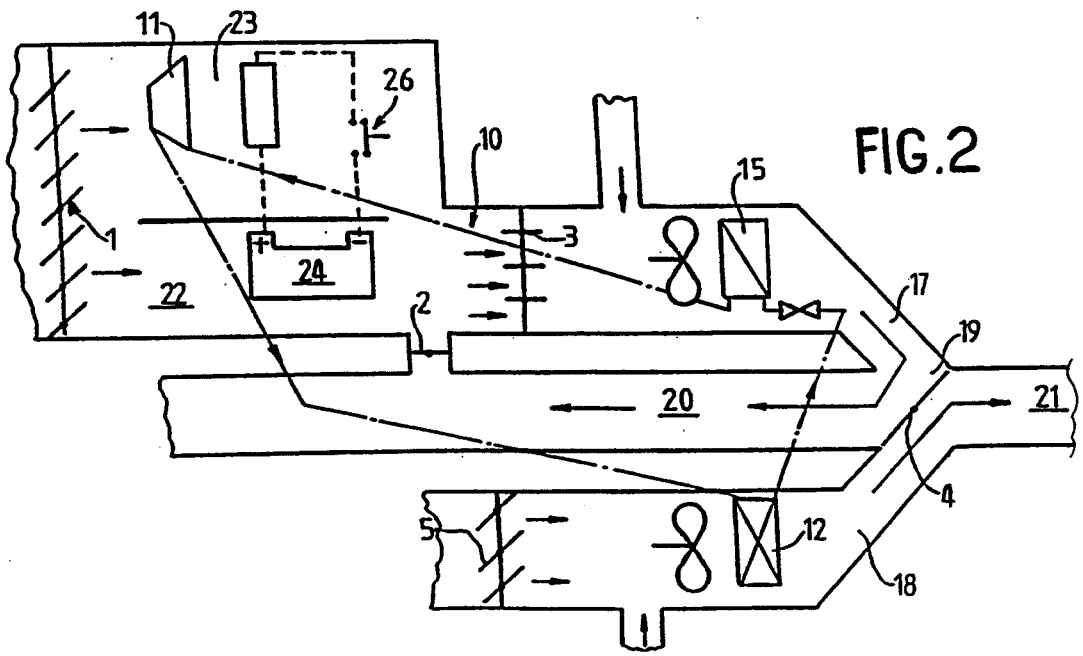
Figure 3:
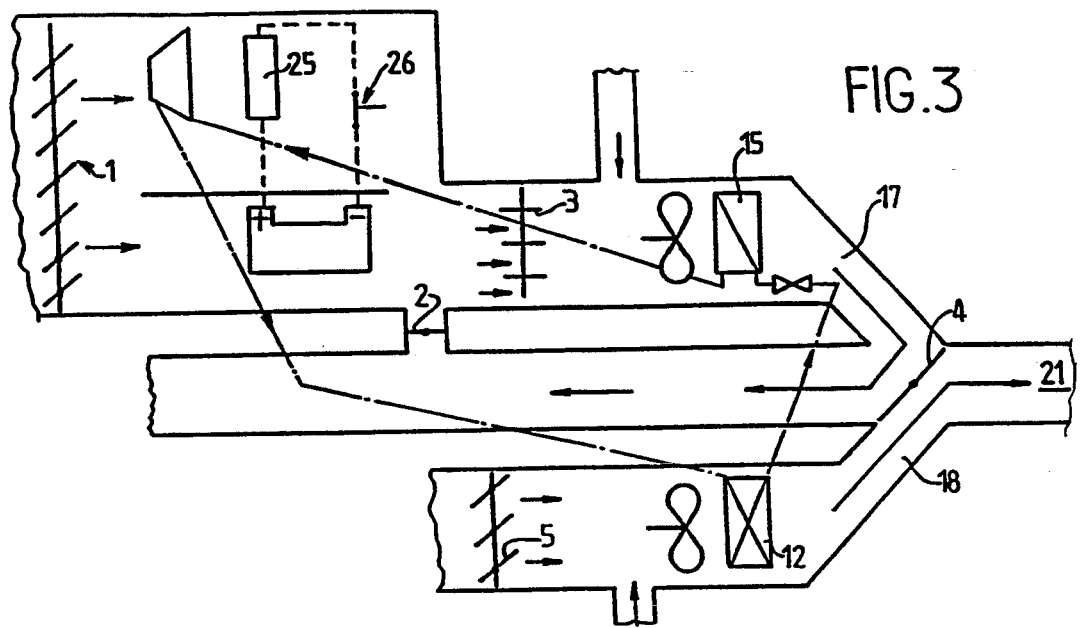
Figure 4:
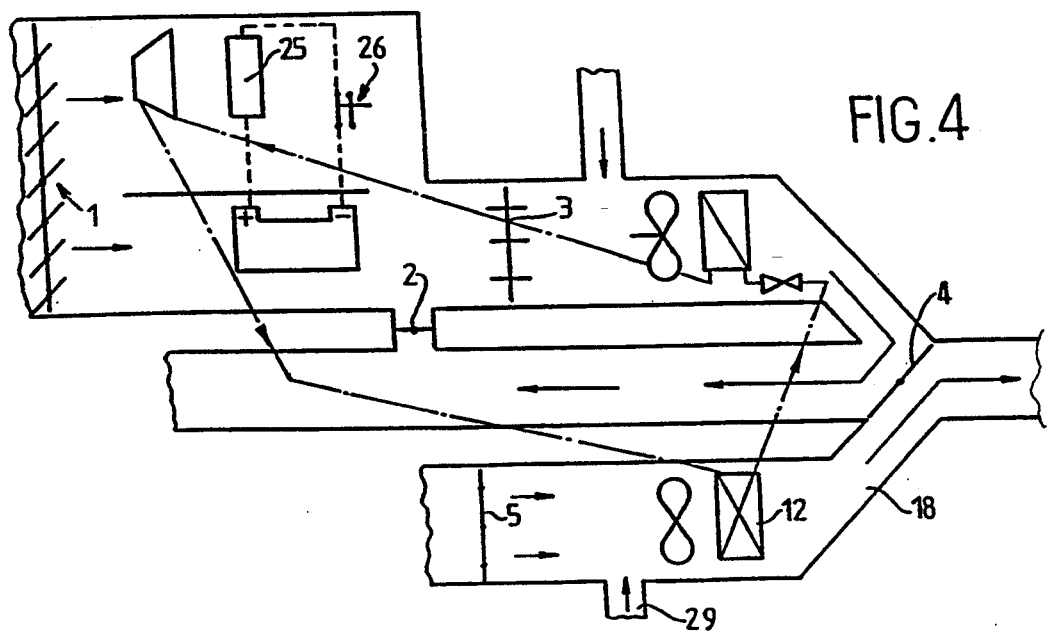
Figure 5:
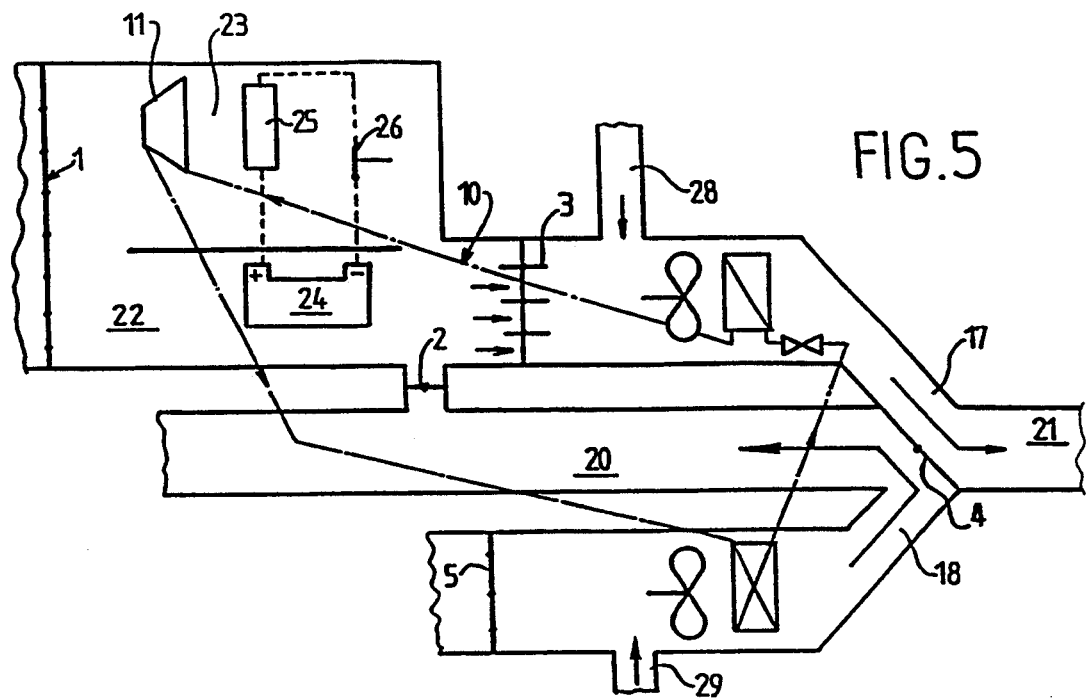

A changeover valve 4 is arranged in the junction zone 19. The valve 4 is arranged to be moved between a first position, which is shown in FIGS. 1 and 5, and a second position which is shown in FIGS. 2 to 4. In the first position, the branches 17 and 18 are in communication with the ducts 21 and 20 respectively. In the second position the branches 17 and 18 are in communication with the ducts 20 and 21 respectively.

Two parallel ducts 22 and 23 of the air circuit are arranged upstream of the obturator 3, so as to communicate with the branch 17 when the latter is open. The branch 22 contains a battery 24 for providing the power supply to an electric propulsion motor of the vehicle. The duct 23 contains the compressor 11 and a heating resistance 25, which is arranged to be supplied with power by the battery 24 through an interruptor 26. A further obturator or shutter valve 1 can be controlled in such a way as to close the common fresh air inlet of the two ducts 22 and 23, for admitting fresh air from outside the vehicle. A bypass obturator or valve 2 controls a bypass part 27, through which the common downstream end of the ducts 22 and 23 can be brought into communication with the evacuation duct 20. Two recycling ducts 28 and 29 enable air to be taken from the cabin of the vehicle into the branches 17 and 18 respectively, upstream of the components 12 to 16 of the circuit 10.

FIG. 1 shows the configuration of the air circuit for use during the summer. The refrigerant fluid circuit is used in the conventional way to produce a cold temperature at the evaporator 15. The obturator 3 is closed or nearly closed, and the motorised fan unit 16 draws recycled air through the duct 28. This air is cooled by contact with the evaporator 15, and passed into the cabin via the duct 21. The condenser 12 is cooled by fresh air from outside the vehicle flowing through the branch 18, the obturator 5 being open. The air which is thus heated is evacuated to the outside via the duct 20, as is the air taken from outside and flowing in the ducts 22 and 23 for cooling the compressor 11 and the battery 24, the obturators 1 and 2 being open. The interruptor 24 is of course open, and the heating resistance 25 is out of service under these conditions. Any partial opening of the obturator 3 enables the temperature in the cabin to be regulated by admitting into it, via the branch 17, a small fraction of the air heated in the ducts 22 and 23.

FIG. 2 shows the configuration of the circuit under conditions when the outside temperature is moderate in winter, i.e. between a lower limit of about 5° to 7° C. and an upper limit of about 15° C. The refrigerant circuit 10 operates so as to produce heat at the condenser 12. The cabin here receives, via the inlet 21, only air which has been heated by this condenser and introduced into the branch 18 through the open obturator 5. The obturators 1 and 3 are also open and the obturator 2 is closed, so that air from outside is admitted into the ducts 22 and 23 so as to cool the compressor 11 and the battery 24. It then passes over the evaporator 15, to which it yields heat before being evacuated to the outside via the junction zone 19 and the air outlet duct 20. Here again the interruptor 26 is open.

FIG. 3 shows the situation in very cold conditions, in which the outside temperature is below the above mentioned lower limit. The positions of the obturators are the same as in FIG. 2, the only difference being the fact that the interruptor 26 is closed. This causes the heating resistance 25 to supply heat to the air flowing over it. The air leaving the ducts 22 and 23 and entering into the branch 17 is thus hotter, which raises the temperature of the evaporator 15 and therefore that of the condenser 12. The latter, in its turn, heats to a greater extent the air flowing in the branch 18 and eventually delivered into the cabin via the inlet 21.

Referring now to FIG. 4, this shows the operation of the apparatus under winter conditions with recycled air. FIG. 4 differs from FIGS. 2 and 3 in that the obturator 5 is here closed, so that the air which has been heated by the condenser 12 and the branch 18 comes from the cabin via the duct 29. According to the value of the outside temperature, the interruptor 26 may be open as in FIG. 2, or closed as in FIG. 3.

FIG. 5 shows the use of the apparatus in winter, on starting of the refrigerant fluid circuit, when the latter is not yet capable of producing the heat necessary for heating the cabin. The obturators 1 and 5 are closed, so that only recycled air is admitted into the branches 17 and 18 via the recycling ducts 28 and 29. The obturator 2 is also closed and the obturator 3 is open so as to bring the branch 17 into communication with the ducts 22 and 23, while the valve 4 is so set as to bring the branches 17 and 18 into communication with the ducts 21 and 20 respectively. The interruptor 26 is closed, and the air delivered into the cabin is heated by the compressor 11, the battery 24 and the resistance 25. Once the refrigerant fluid circuit 10 has become fully operational, the apparatus goes into the appropriate one of the configurations described above as reference to FIGS. 2 to 4.

Figure 6:
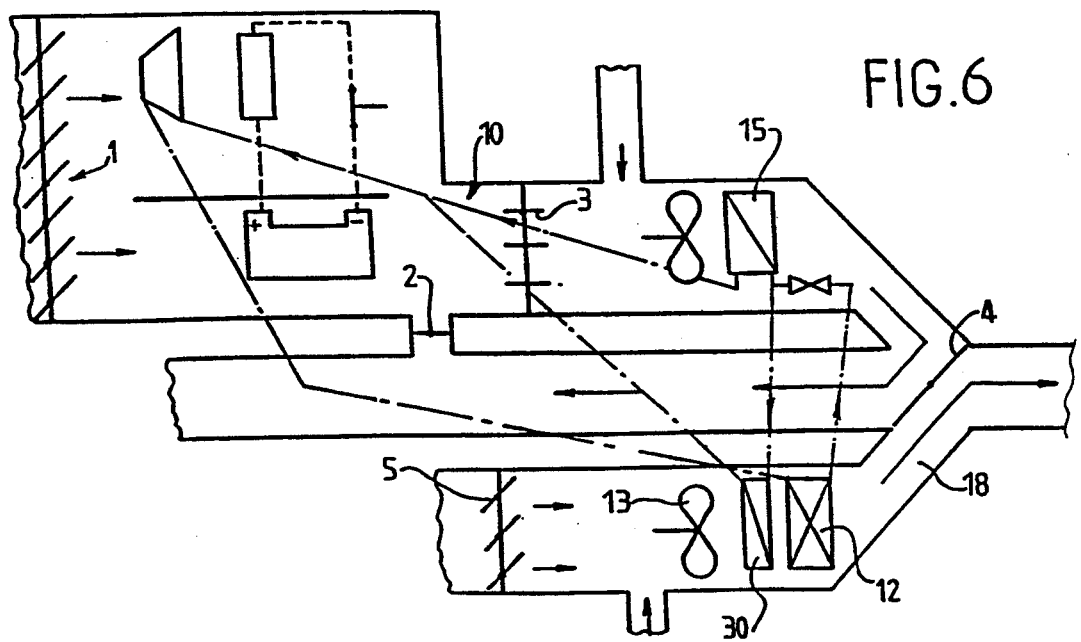
FIG. 6 is a diagram similar to FIG. 2, but relates to a modified version of the apparatus.

Reference is now made to FIG. 6, which shows a modified version of the apparatus seen in FIGS. 1 to 5, in a configuration corresponding to that of FIG. 2. This modification is characterised by the presence of a second evaporator 30, which is arranged in the refrigerant fluid circuit 10 in parallel with the evaporator 15, being disposed in the branch 18 of the air circuit. In this example, the second evaporator 30 is arranged upstream of the condenser 12, so that the air stream produced by the motorised fan unit 13 can also pass over the evaporator 30. The latter is interposed between the motorised fan unit 30 and the condenser 12, and causes the humidity which is present in the air stream passing through the branch 18 to be condensed. This therefore assists demisting of the windshield of the vehicle.

In the apparatus of FIGS. 1 to 5, as in that shown in FIG. 6, each of the obturators 1, 3 and 5 may be set in various intermediate positions so as to regulate the fraction of recycled air that passes through the branches 17 and 18 of the air circuit.

What is claimed is:

1. Temperature regulating apparatus for the cabin of a vehicle, comprising:
    an air conditioning apparatus defining an air circuit having a first branch and a second branch, each said branch having a respective upstream end and downstream end;
    two inlets for external air, associated, respectively, with the upstream ends of said first and second branches;
    an air outlet duct for evacuating air to the outside of the vehicle and having an upstream end, and a cabin air inlet, the upstream ends of the evacuation duct and cabin air inlet being connected to the downstream ends of said first and second branches;
    an upstream branch subdivided into two parallel ducts and interposed between the first branch and its associated air inlet, with components of the vehicle to be cooled being disposed in said upstream branch, said components including a power supply battery disposed in said first duct and a compressor disposed in said second duct;
    an evaporator in the first branch;
    a condenser in the second branch; and
    a refrigerant fluid circuit including the evaporator and condenser, said refrigerant circuit arranged for flow of a refrigerant fluid in one direction in which the evaporator is followed by the condenser in the refrigerant circuit, so that said fluid can receive heat in the evaporator from an air stream in the first branch and yield heat in the condenser to an air stream in the second branch, wherein the apparatus further includes means for selectively bringing each of said first and second branches into communication with a corresponding one of the cabin air inlet and the air evacuation duct, whereby the airstream is selectively cooled by contact with the evaporator or heated by contact with the condenser before being delivered into the cabin.

2. Temperature regulating apparatus for the cabin of a vehicle, comprising:

an air conditioning apparatus defining an air circuit having a first branch and a second branch, each said branch having a respective upstream end and downstream end;

two inlets for external air, associated, respectively, with the upstream ends of said first and second branches;

an air outlet duct for evacuating air to the outside of the vehicle and having an upstream end, and a cabin air inlet, the upstream ends of the evacuation duct and cabin air inlet being connected to the downstream ends of said first and second branches;

an upstream branch subdivided into two parallel ducts and interposed between the first branch and its associated air inlet;

an evaporator in the first branch;

a condenser in the second branch;

a refrigerant fluid circuit including the evaporator and condenser, said refrigerant circuit arranged for flow of a refrigerant fluid in one direction in which the evaporator is followed by the condenser in the refrigerant circuit, so that said fluid can receive heat in the evaporator from an air stream in the first branch and yield heat in the condenser to an air stream in the second branch, wherein the apparatus further includes means for selectively bringing each of said first and second branches into communication with a corresponding one of the cabin air inlet and the air evacuation duct, whereby the airstream is selectively cooled by contact with the evaporator or heated by contact with the condenser before being delivered into the cabin; and wherein the components of vehicle to be cooled are disposed in said upstream branch, said components including a power supply battery in said first duct and a compressor disposed in said second duct.

3. Apparatus according to claim 1, further including controllable heating means disposed in the said upstream branch.

4. Apparatus according to claim 1, further comprising: bypass means connected between the downstream end of the said upstream branch and the air evacuation duct, the bypass means being adjustable to bring the upstream branch and air evacuation duct selectively into communication with each other; means for closing the inlet of the upstream branch; and a first recycling duct connected to the said first branch for delivering air from the cabin into the latter when the latter is receiving no air from the upstream branch.

5. Apparatus according to claim 1, further including means for closing the said air inlet associated with said second branch, and a second recycling duct for bringing air from the cabin into the second branch when the said inlet is closed.

6. Apparatus according to claim 1, further including a second evaporator in the second branch, arranged in parallel in the refrigerant fluid circuit with the first evaporator in the first branch.

* * * * *